United States Patent [19]
Brzezinski

[11] 3,765,244
[45] Oct. 16, 1973

[54] DIGITAL READOUT INSTRUMENT EMPLOYING TRANSDUCER AND DOUBLE D.C. POWER SUPPLY

[76] Inventor: Janusz Brzezinski, c/o John E. Wagner, Patent Atty., 1041 East Green St., Pasadena, Calif. 91106

[22] Filed: Apr. 19, 1971

[21] Appl. No.: 135,338

Related U.S. Application Data

[63] Continuation-in-part of Ser. No. 32,142, April 27, 1970, abandoned.

[52] U.S. Cl. .......... 73/362 AR, 323/75 H, 323/75 R
[51] Int. Cl. .............................................. G01k 7/24
[58] Field of Search ............. 73/362 AR; 323/75 H, 323/75 N

[56] References Cited
UNITED STATES PATENTS

| | | | |
|---|---|---|---|
| 3,545,273 | 12/1970 | Friberg et al. | 73/362 AR |
| 3,287,978 | 11/1966 | Knudsen | 73/362 AR |
| 3,441,846 | 4/1969 | Petrohilos | 73/362 AR |
| 2,649,715 | 8/1953 | Goble | 73/362 AR |
| 3,250,991 | 5/1966 | Beeston | 73/362 AR X |
| 3,254,533 | 6/1966 | Tongret | 73/362 AR |
| 3,469,449 | 9/1969 | Keller | 73/362 AR |

Primary Examiner—Richard C. Queisser
Assistant Examiner—Frederick Shoon
Attorney—John E. Wagner

[57] ABSTRACT

A digital readout thermometer employing a resistance bridge with a temperature sensitive resistance such as a thermistor in one leg of the bridge and including a motor driven adjustable resistance or potentiometer for rebalancing the bridge. A servo amplifier and d.c. servo motor servo drive a digital counter to provide a reading indicative of the temperature. The circuit employs a d.c. power supply for the bridge circuit and a second d.c. power supply cooperating with the first power supply for furnishing the servo circuit with opposite polarity voltages whereby the digital counter will operate in both directions.

4 Claims, 2 Drawing Figures 3,765,244

DIGITAL READOUT INSTRUMENT EMPLOYING TRANSDUCER AND DOUBLE D.C. POWER SUPPLY

RELATED INVENTIONS

This is a continuation in part of my application, Ser. No. 32,142 filed Apr. 27, 1970, and now abandoned.

BACKGROUND OF THE INVENTION

With the advent of miniaturized electronic circuits and solid state temperature sensing devices the development of an all electronic thermometer for human use is possible. As a result, a number of such devices have been produced. Generally they employ thermistors as the temperature sensing element, a Wheatstone bridge, a power supply and a meter for reading bridge unbalance as an indicator of temperature. Such thermometers using a meter give only a transitory reading and incur the problems associated with accurately reading a meter. Therefore the need for a digital readout thermometer has been recognized.

A number of digital readout electronic thermometers have been developed as typified by U.S. Pat. Nos. 3,469,449; 3,408,568; 3,469,449; and 3,441,846. Characteristically the digital readout thermometers developed to date require complex circuitry such as synchronous detectors, phase frequency or voltage references, chopper circuits, clocks or other circuits which are subject to drift and require compensation of various types.

BRIEF STATEMENT OF THE INVENTION

In fulfilling the need for an effective digital readout thermometer, I have invented an electronic thermometer employing a resistance bridge with a temperature sensor in one leg of the bridge, an adjustable potentiometer for balancing the bridge, a servo amplifier and motor and digital counter.

The device employs only direct current sources and simple substantially linear circuits throughout.

Likewise I have utilized a pair of simple easily replaceable batteries as the power supplies for the thermometer. The power supplies are so designed and arranged that the bridge circuit supply voltage is regulated while the servo circuit is unregulated but bipolar to provide bidirectional movement of the digital readout device.

One feature of the invention resides in the power supply circuit whereby a low battery or dead battery condition is indicated and incorrect reading will not occur.

DETAILED DESCRIPTION OF THE INVENTION

Figure 1:
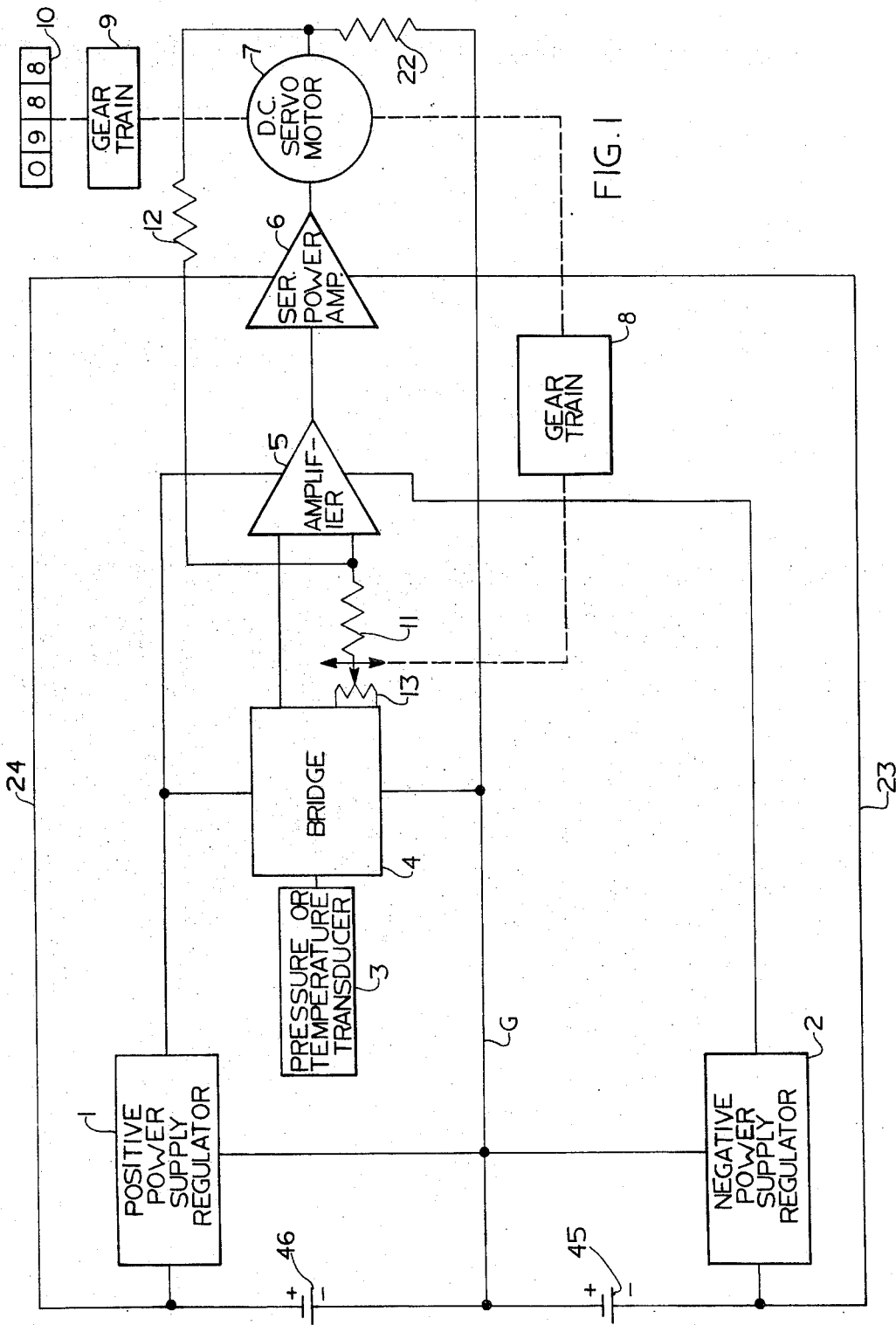
FIG. 1 is a block diagram of the digital meter of the invention.

Referring now to the drawing, FIG. 1. An electronic thermometer or pressure sensor in accordance with this invention is shown as including a pair of power supplies 1 and 2, one a positive potential supply associated with a battery 46 and a negative potential supply associated with battery 45. The two power supplies 1 and 2 are connected to a common terminal or system ground lead G.

The power supply 1 is connected across bridge circuit 4 which has as one input a pressure or temperature transducer 3. The bridge circuit 4 includes an adjustable element 14 as a variable arm. The adjustable slider of the potentiometer or adjustable resistance element 13 is connected via resistance 11 to an amplifier 5 which in turn is connected to a servo power amplifier 6 designed to provide sufficient current to drive the mechanical components of the system, including a d.c. servo motor 7, gear trains 8 and 9, and a digital counter 10. System ground for the servo motor 7 is provided through resistance 22 to ground lead G. The servo motor is coupled mechanically through gear train 9 to drive the counter 10 and through gear train 8 to drive the wiper of potentiometer 13. A feedback loop from the servo motor 7 is provided through resistance 12 to the input of the amplifier 5. Thus, a complete position servo loop is provided by the following components: potentiometer 13, resistance 11, amplifiers 5 and 6, servo motor 7, and resistance 12 and 22. Note particularly in FIG. 1 that two batteries 45 and 46 are connected in series with the ground lead G at the center tap between the negative terminal of battery 46 and the positive terminal of battery 45. The battery 46 supplies the potential across the bridge. This potential is regulated by supply 1. The batteries 45 and 46, together with their respective negative and positive power supply regulators 2 and 1, provide regulated potentials to the amplifier 5 and the same batteries provide unregulated opposite potentials via leads 23 and 24 to the servo power amplifier 6. Inasmuch as the servo power amplifier is in the null seeking servo loop, regulated power supplies are not required. Likewise, the independence of the bridge circuit supply from the drive motor supply as afforded by the circuits 1 and 2 minimizes any node voltage changes at the bridge due to motor current requirements.

Figure 2:
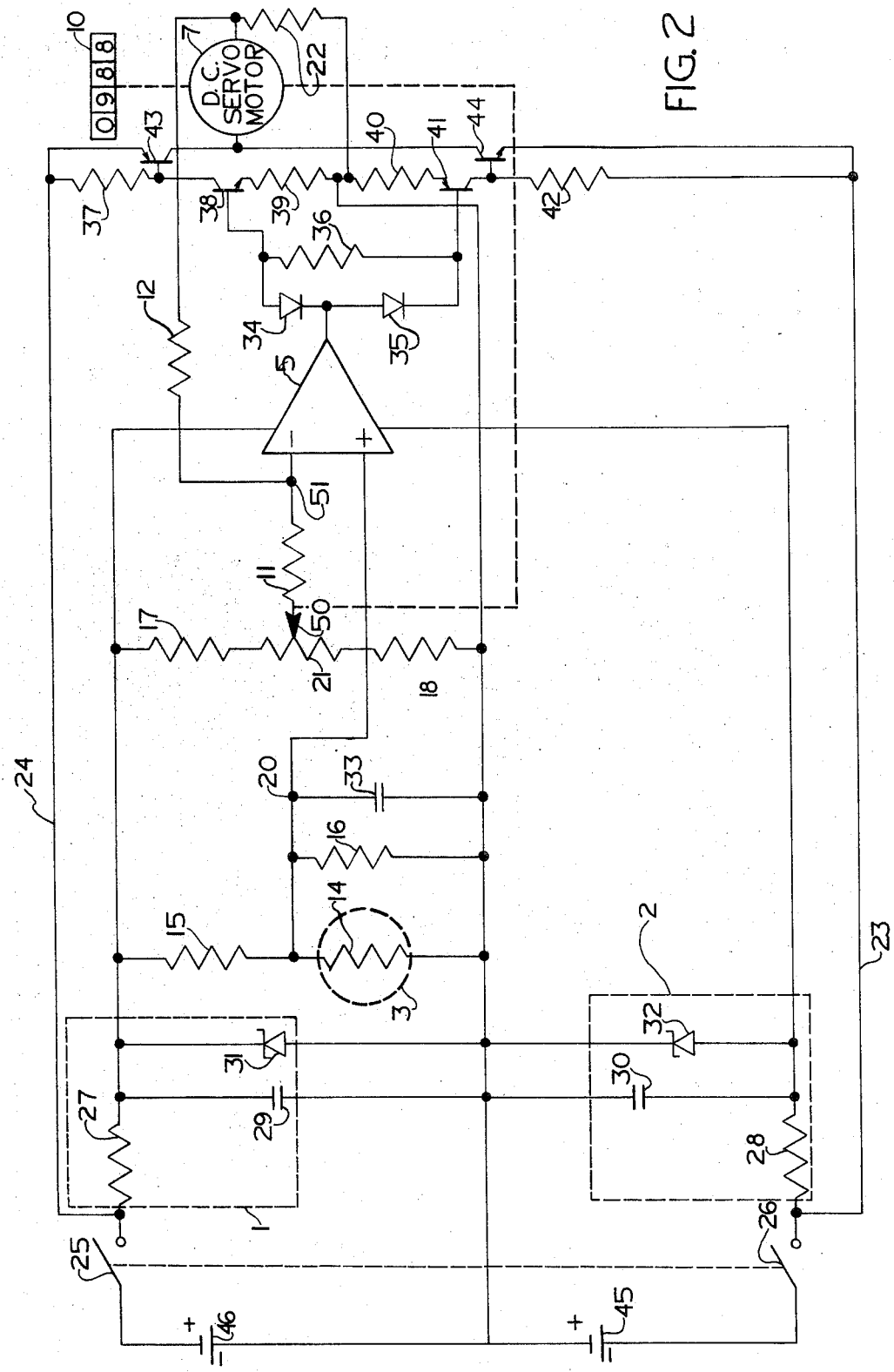
FIG. 2 is a schematic diagram of the electric circuit of the meter of invention.

The details of the circuit of this invention are more clearly seen in FIG. 2 showing the electrical schematic of the device. It may be seen that in addition to the basic elements of the invention shown in FIG. 1, the circuit employs a pair of switches 25 and 26 which serve to connect the batteries 45 and 46 to the remainder of the circuit. These two switches constitute the main power switch for the circuit. Also, the positive power supply 1 of FIG. 1 in actuality constitutes a voltage regulator employing a series resistor 27, a shunt to ground capacitor 29 and similarly shunted to ground Zener diode 31. The negative power supply 2 of FIG. 1 likewise is made up of a series resistance element 28, a shunt capacitor 30 and a shunt Zener diode 32. This configuration is well known in the art as an effective voltage regulator. The supply regulator is made up of the components identified above supplying a regulator voltage of six volts to the bridge circuit 4 made up of resistance elements 15, 16, 17 and 18 connected in the conventional Wheatstone bridge configuration. The transducer 3 of FIG. 1 constitutes a temperature sensitive resistance for thermistor 14 while the potentiometer 13 of FIG. 1 includes resistance element 21 and wiper 50. A capacitor 33 connected across the resistance 16 and the thermistor 14 serves to improve the signal to noise ratio. They act as an RF filter.

The amplifier 5 is designed to amplify the differential voltage, if any, appearing at the terminals 20 and 51 in the same manner as a conventional meter in a Wheatstone bridge. The output voltage, whether of positive or negative polarity with respect to ground, is passed through diode 34 or 35, respectively, at the input to the two-stage servo amplifier including transistors 38, 41, 43 and 44 with their associated resistance elements 37, 39, 40 and 42. All elements of transistors 28, 41, 43 and 44 and diodes 34, 35 and resistors 36, 37, 39, 40 and 42 constitute the servo amplifier of FIG. 1.

Viewing now FIGS. 1 and 2, it is apparent that I have an exceedingly simple circuit for providing digital readout of a sensed condition, such as, human body temperature, employing basically linear circuitry. The circuit employs two batteries of similar nature, such as a conventional 9 volt battery designed primarily for transistor radio use. The circuitry is arranged such that one such battery provides the potential for the Wheatstone bridge after being regulated by the supply regulator 1. The first and second batteries cooperate to provide unregulated bi-directional voltage for operating the servo circuitry where bi-directionality is required but regulation is of less significance.

Employing the power supply circuit as described above, certain unique features are possible in this device. First, the measurement circuitry is supplied by one battery only so that variations in terminal voltage of that battery will not affect the bridge balance. The amplifier 5 characteristically has a minimum operating voltage and, if the battery 46 supplying potential to the bridge and additionally to the amplifier 5 has insufficient residual power, no error signal from amplifier 5 will be applied to the servo system and the digital readout will not move. If the battery 45 has insufficient power for operation while battery 46 is adequate, the bridge circuit and amplifier 5 will be operative and an error correction signal driving the servo motor full to one end will be introduced into the servo circuit. Depending upon the connection of the servo motor, the digital counter will run either to 90° or 110°, both of which are outside of the range of correct values and obvious to the user that the device is out of service.

Given the above power supply circuit, the instantaneous testing of the operativeness of the system can easily be accomplished merely by closing the switches 25 and 26 when the sensor is under ambient temperature (90°-110°). If the digital counter runs to a minimum value such as 90°, it clearly indicates that the circuit is operative since there was clearly sufficient power capability in the battery to operate the bridge circuit in the battery 46 and sufficient power in the circuit in the battery 45 to drive the servo motor. The system is therefore fail-safe and any lack of battery power produces a clearly impossible reading.

The circuit is designed to use such components which are almost insensitive to ambient temperature. This means approximately no error due to ambient temperature.

The preferred embodiment of this invention is illustrated in the drawing and described above as employing regulated power supplies and with the bridge circuit connected across battery 46. It must be recognized that the bridge circuit may instead be connected across battery 45 or across both batteries 45 and 46 with similar performance. If unregulated power supplies are used, the thermometer will of course work but its accuracy is decreased.

The above described embodiments of this invention are merely descriptive of its principles and are not to be considered limiting. The scope of this invention instead shall be determined from the scope of the following claims including their equivalents.

I claim:

1. A battery powered portable system for digitally displaying a measured parameter comprising:
    A transducer having electrical characteristics varying with the parameter to be measured;
    A rebalancing bridge including said transducer as the leg of said bridge;
    An adjustable leg of said bridge capable of rebalancing the bridge to compensate for variation in the bridge balance because of said transducer;
    A first battery;
    Means for applying the potential from said first battery across said bridge to provide operating potential therefore;
    An amplifier connected to said bridge to amplify the potential from said bridge related to the position of said adjustable leg of said bridge;
    A second battery;
    Means for applying power from said first and second batteries to said amplifier whereby said amplifier provides an output signal related in magnitude and polarity to the degree and direction of adjustment of said adjustable leg;
    Servo means driven by said amplifier including a digital display device for displaying a visual indication of the parameter measured by said transducer;
    Said servo means including a feedback connection between said servo means and said bridge to reduce the signal produced by said amplifier to substantially zero while said indicator matches in reading the parameter measured by said transducer; and
    Said first and second batteries connected to said servo means to drive said servo means;
    Including voltage regulator means for applying regulated potential from said first and second batteries comprising a pair of Zener diode networks furnishing regulated opposite potentials to said amplifier whereby the output of said amplifier is a function of the differential potential at its signal input and insensitive to supply potential variations.

2. The combination in accordance with claim 1 including means for applying unregulated opposed polarity power from said first and second batteries to said servo means.

3. A portable battery powered electronic thermometer comprising:
    a temperature sensitive resistance;
    a resistance bridge including said temperature sensitive resistance in one leg thereof;
    said bridge also including a potentiometer for balancing said bridge;
    first battery power supply means for applying a potential across said bridge;
    amplifier means connected to said balancing potentiometer for amplifying any bridge unbalance potential;
    a digital readout device connected to said amplifier means for recording a temperature as sensed by said temperature sensitive resistance as a measure of the balancing potentiometer position;
    motor means for driving said digital readout device;
    a feedback connection means between said motor means and said amplifier means for completing a servo loop between said balancing potentiometer and said digital readout device;

means connecting said first power supply means to provide power to drive said motor means in one direction; and, second battery power supply means connected to said motor means for driving the readout device in the opposite direction;

said first battery power supply means includes voltage regulator means for maintaining a substantially constant voltage across said bridge; and including amplifier means for amplifying a difference voltage related to the unbalance of the bridge wherein said first and second battery power supply means provide regulated voltage to said amplifier means.

4. A portable battery powered electronic thermometer comprising:

a temperature sensitive resistance;

a resistance bridge including said temperature sensitive in one leg thereof;

said bridge also including a potentiometer for balancing said bridge;

first battery power supply means for applying a potential across said bridge;

amplifier means connected to said balancing potentiometer for amplifying any bridge unbalance potential;

a digital readout device connected to said amplifier means for recording a temperature as sensed by said temperature sensitive resistance as a measure of the balancing potentiometer position;

motor means for driving said digital readout device;

a feedback connection means between said motor means and said amplifier means for completing a servo loop between said balancing potentiometer and said digital readout device;

means connecting said first power supply means to provide power to drive said motor means in one direction; and, second battery power supply means connected to said motor means for driving the readout device in the opposite direction; wherein said first battery power supply means includes voltage regulator means for maintaining a substantially constant voltage across said bridge; wherein said second battery power supply means is connected to drive said servo motor fully in one direction in the absence of power from said first battery power supply means to indicate the inoperativeness of said first battery power supply means.

* * * * *